W. H. McNUTT.
SAFETY CLOSURE.
APPLICATION FILED MAR. 13, 1913.
1,093,576.
Patented Apr. 14, 1914.
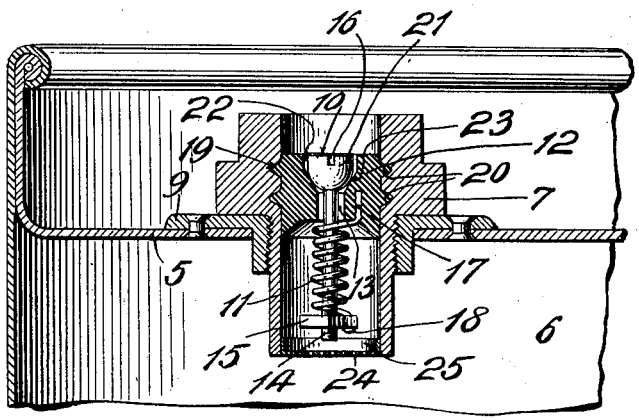
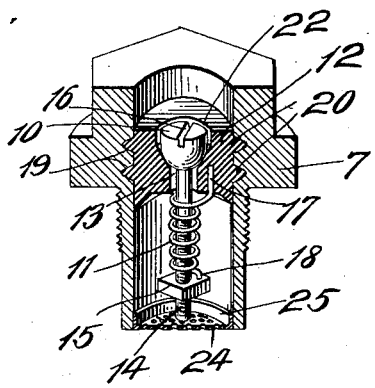
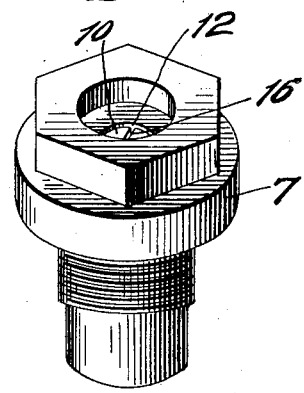
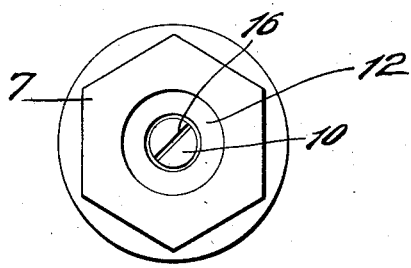
Witnesses:
Inventor
WILLIAM H. McNUTT.
By his Attorney,
William H. Reid.

UNITED STATES PATENT OFFICE.

WILLIAM H. McNUTT, OF NEW YORK, N. Y., ASSIGNOR TO CARRIE EMMA OWEN, OF FRANKLIN, NEW YORK.

SAFETY-CLOSURE.

1,093,576.  Specification of Letters Patent. Patented Apr. 14, 1914.

Application filed March 13, 1913. Serial No. 753,909.

*To all whom it may concern:*

Be it known that I, WILLIAM H. MCNUTT, a citizen of the United States, and a resident of New York city, in the county of New York and State of New York, have invented certain new and useful Improvements in Safety-Closures, of which the following is a specification.

One of the objects of this invention is to provide a bung sleeve or bushing for a container of explosive fluids, with a safety pop-off valve device operative upon abnormal pressure in the vessel to open and relieve the pressure to prevent bursting or explosion; which valve device is adjustable to vary the tension of the controlling means by the operation of turning the valve, from the engagement of the external or exposed part of the valve by a screw driver or other suitable tool or device.

A further object is to provide in such a device, means for the locking or holding against turning, of the nut that engages the threaded stem of the valve, whereby the turning of the valve by its exposed head will vary the tension of a coil spring that engages the nut to normally retain the valve seated.

Figure 1 is a vertical section of a container top carrying my invention. Fig. 2 shows a sectional view of the closure separate from the container. Fig. 3 is another view of the closure; and Fig. 4 is a plan of the closure.

This invention is in the nature of an improvement on the structure forming subject matter of Letters Patent granted to me August 8, 1911, No. 999,829. In such structure I provide a sleeve having its bore normally closed by a spring controlled valve, operative to rise upon a certain abnormal pressure in the container, and such valve has the tension of the spring adjustable, but only by removing the sleeve and valve from the container, to permit access to the nut on the valve stem inside of the sleeve. In the present invention I obviate this removal of the sleeve and valve from the container, by providing means that holds the nut that confines the spring against turning, and by making the outer exposed portion of the valve adapted to be engaged by a suitable tool, such as a screw driver; and by further arranging a coil spring between the nut and the inner wall of the sleeve, whereby rotation of the valve stem will cause the nut to approach or to recede from the sleeve, and thus vary the normal compression of the spring. The said patent also sets forth a fusible connection between the valve, or the valve device including its seat portion, and the sleeve or casing, whereby a certain degree of heat, either inside of the container, or in the vicinity, will cause this connection to melt, and the valve device will be ejected entirely by the pressure in the container, giving free exit for the gases in the container.

The present invention is shown embodied in a similar arrangement of fusible safety device with pop-off valve, but it is to be understood that my invention is equally applicable and advantageous where the fusible connection is not employed.

As shown in the drawing, the head 5, of the container 6, carries a bung or bushing 7, that has its outer wall screw-threaded and screwed into a spud or collar 9, suitably secured in the head. The bore of the bushing is controlled by a pop-off valve 10, that is normally held seated by a spring 11, to open outwardly from internal pressure.

The seat portion, or member, of the bushing 7, denoted generally by 12, has a bore 13, at the upper part of which is the seat portion, and the valve stem 14, projects down through the bore, and is provided with screw threads at the lower portion, on which turns a nut 15.

The spring 11, is shown in the form of a coil or helix, that surrounds the valve stem 14, and has the lower end suitably secured to the nut 15, while the upper end portion of the spring is suitably confined and secured to prevent turning of the nut when the valve is rotated.

The valve 10, is formed with a tool-engaging portion at its head, such for instance as a slot 16, adapted to engage a screw-driver. By thus turning the valve, it will be apparent that since the nut is prevented from turning by the spring, but is free to move up and down, the nut will shift on the valve stem 14, and either increase or relieve the tension of the spring 11, to vary the pressure under which the valve is retained seated, which pressure must be overcome to enable the valve to be unseated by the pressure in the container, to give exit to the confined gas.

In the said patent of mine, I provide a fusible seat member or portion for the valve, and in the form shown herein I form the seat portion or member 12, of fusible material of any desired structure or composition; such as lead or an alloy, that will melt or fuse at a comparatively low temperature, such as about 400 degrees F. With such a form of valve seat I preferably embed the upper end portion 17, of the spring 11, in the seat member 12, as by casting it therein, that will securely hold the spring in place and prevent it and the nut turning when the valve stem is rotated. The lower end 18, of the spring may be riveted in a hole in the nut 15.

The valve seat member 12 is shown in the form of a sleeve or lining for the bore of the bushing 7, having recesses 19, into which extend integral projections 20, of the fusible sleeve 12, to secure the sleeve in the bushing.

Where two metallic surfaces are held in intimate contact, such as a valve and its seat, they are liable to become cemented together from corrosion of one or both faces. But with the valve seat of fusible metal, the heat will melt it and hence release the valve, should it become adhered.

Since the nut 14 is locked against turning and does not need any attention, the lower end of the bushing tube 7, can be permanently closed; which is preferably effected by a flame-proof diaphragm; shown in the form of a disk of finely perforated sheet metal, 24, with the margins 25 bent up to form a flange of annular form, by which the cap thus made is forced into the lower end of the bushing to have a driving fit therein, and held in position by friction. Such a member is very easily and cheaply made, and secured in position by simply inserting by pressure. This member, especially when the valve has been expelled from the melting of the fusible valve seat, will prevent any possibility of flame or ignited or red hot particles passing down into the container.

It will thus be seen that I provide in a pop-off valve arrangement, normally seated under spring pressure, a means for easily, quickly and safely adjusting the tension of the controlling spring without removing the bung or bushing from the container, or disturbing the bung in any manner; by simply applying a suitable small tool, such as a screw-driver, to the valve head and turning the valve to vary the tension of the spring; which is effected by locking the nut that confines the spring controlling the valve, and which in the form disclosed herein, employs the controlling spring for this purpose. It will also be understood that when the pressure in the container becomes dangerously high, from great heat or a fire in the vicinity of the container, or even from the generation of gas in the container itself from spontaneous chemical action taking place in the container, or in the vicinity, the gas will lift the valve and escape, and passing rapidly through the annular passage around the valve head, will give a signal, that will warn persons in the vicinity that conditions exist that require attention.

When the heat reaches a high degree, the fusible seat around the valve, and in which the spring is anchored, will melt, and the valve and also the spring and the seat portion will be blown out, thereby providing free and unrestricted exit passage for the confined gas in the container. But to insure any possibility of flame in the vicinity passing down the bung tube with the valve and valve seat removed, the diaphragm of finely apertured metal is provided in the lower end of the bushing tube, and since the nut is permanently locked, and never needs to be engaged to turn it or to prevent its turning, this diaphragm is a permanent closure in the end of the bushing tube. It will be also understood that the valve can be entirely unscrewed and removed from the closure, and the nut be still supported in proper place by the spring; so that the valve can be replaced after removal; or another valve substituted, that will engage the nut as before and be held under pressure by the coil spring; to be adjusted by the turning of the stem of the valve, as set forth herein. The valve being held seated under strong spring pressure, will prevent its turning under jars of the container; assisted by the friction between the nut and the valve stem, from the tension of the spring.

Having thus described my invention, what I claim is:—

1. In a safety closure for containers, a body member, a valve seated in the bore of the body member and having its stem threaded and extending through the bore of the body member, a nut on the valve stem, and a spring for normally holding the valve seated and arranged with one end secured to the nut and the other end portion secured to the body member to prevent the nut turning with the valve stem.

2. In a safety closure for containers, a body member, a valve seated in the bore of the body member and having its stem threaded and extending through the bore of the body member, a nut on the valve stem, and a spring for normally holding the valve seated and arranged with one end secured to the nut and the other end portion secured to the body member to prevent the nut turning with the valve stem, the valve head having a tool-engaging end portion.

3. In a safety closure, a lining sleeve of fusible metal, a valve seated in the bore of the sleeve and having its stem threaded and extending through the bore of the sleeve, a nut on the valve stem, and a spring for normally holding the valve seated and arranged with one end secured to the nut and the other end portion connected with the sleeve to prevent the nut turning with the valve stem.

4. A reciprocating valve mechanism including a seat and a valve operating through the seat and a spring to hold the valve normally seated, the valve being connected with the spring to permit of its adjustment by the rotation of the valve.

5. A reciprocating valve mechanism including a fusible seat and a valve operating through the seat and a spring to hold the valve normally seated, the valve being connected with the spring to permit of its adjustment by the rotation of the valve.

WILLIAM H. McNUTT.

Witnesses:
AGNES OLSEN,
WILLIAM H. REID.